United States Patent [19]

Pickwell et al.

[11] Patent Number: 4,550,056

[45] Date of Patent: Oct. 29, 1985

[54] ELECTRICAL CABLE CONTAINING CURED ELASTOMERIC COMPOSITIONS

[75] Inventors: Robert J. Pickwell, Mt. Kisco; Frederick D. Osterholtz, Pleasantville, both of N.Y.

[73] Assignee: Union Carbide Corporation, Danbury, Conn.

[21] Appl. No.: 700,313

[22] Filed: Feb. 11, 1985

Related U.S. Application Data

[62] Division of Ser. No. 485,301, Apr. 15, 1983, Pat. No. 4,526,922.

[51] Int. Cl.$^4$ .......................... B32B 11/06; H01B 7/00
[52] U.S. Cl. .............................. 428/391; 174/110 AR; 428/375; 428/379
[58] Field of Search ................ 428/375, 379, 391; 174/110 SR, 110 S, 110 PM, 110 AR, 110 SY; 528/24, 33, 34, 32; 525/105, 106, 479; 524/445

[56] References Cited

U.S. PATENT DOCUMENTS

| | | | |
|---|---|---|---|
| 4,243,542 | 1/1981 | Mine | 174/110 S |
| 4,395,526 | 7/1983 | White et al. | 528/18 |
| 4,400,429 | 8/1983 | Barlow et al. | 174/110 S |
| 4,405,687 | 9/1983 | Morita et al. | 174/110 S |
| 4,417,042 | 11/1983 | Dziark | 528/901 |

Primary Examiner—Lorraine T. Kendell
Attorney, Agent, or Firm—Paul W. Leuzzi, II

[57] ABSTRACT

Novel coupling compositions for improving adhesion between an organic elastomer and an inorganic substrate comprise (A) an ethylenically unsaturated silane, having bonded to silicon, at least one hydroxy group and/or alkoxy group reactive with the inorganic substrate and at least one ethylenically unsaturated group polymerizable with the organic elastomeric matrix; (B) an organosiloxane oligomer, having bonded to silicon, at least one hydroxy and/or alkoxy group reactive with said inorganic substrate; and (C) optionally, an ethylenically unsaturated organosiloxane oligomer, having bonded to silicon, at least one ethylenically unsaturated group polymerizable with said organic elastomeric matrix.

The novel curable compositions contain the novel coupling compositions, an organic elastomer, an inorganic filler, and a peroxide crosslinking agent. The novel cured compositions are produced by heating the novel curable composition to a temperature above the decomposition temperature of the peroxide thereby inducing crosslinking of the organic elastomer. The novel electrical cable comprises a conductor having a coating of insulation which comprises the novel cured composition.

4 Claims, No Drawings

ELECTRICAL CABLE CONTAINING CURED ELASTOMERIC COMPOSITIONS

This application is a division of prior U.S. application Ser. No. 485,301, filed 4/15/83, now U.S. Pat. No. 4,526,922.

BACKGROUND OF THE INVENTION

1. Field Of The Invention

This invention relates to filled organic elastomeric matrixes and to coupling compositions added to the filler-organic elastomeric matrix for conserving or enhancing the physical and electrical properties of the filled organic elastomeric matrix. The invention more particularly relates to novel coupling compositions for addition to filler-organic elastomer blends for providing curable compositions having special application as insulation coatings for electrical cables upon curing with organic peroxides. The invention also relates to curable compositions containing the filler, organic elastomer, peroxide and coupling composition and to cured compositions resulting therefrom. The invention also relates to electrical cables provided with such cured compositions and methods for making same.

2. Description Of The Prior Art

A substantial amount of research has been performed heretofore in connection with the treatment of fillers or reinforcing agents for the purpose of improving physical or mechanical properties of plastics, resins or rubbers reinforced with the filler. Much of this research has centered on the pretreatment of glass fiber reinforcement materials for resins and rubbers. For example, U.S. Pat. No. 3,702,783 describes the application as a size to glass fibers of a blend of 3-glycidoxypropyltrimethoxysilane and methyltrimethoxysilane. U.S. Pat. No. 3,816,235 discloses a size composition for the treatment of glass fibers wherein the size composition contains a blend of aminoalkyltriethoxysilane and methyltriethoxysilane. U.S. Pat. No. 3,944,707 discloses the use as a size for glass fiber reinforcement for plastics, blends of vinyl silane or vinyl siloxanes and a beta-haloalkoxysilane. Similarly, U.S. Pat. No. 3,993,837 discloses glass fiber size compositions containing blends of epoxyalkylsilane or siloxane and a beta-haloalkoxysilane.

U.S. Pat. No. 4,049,865 discloses glass fiber size compositions containing a blend of an aminoalkylsilane and a vinyl silane. U.S. Pat. No. 4,130,677 discloses the sizing of glass bottle surfaces with am aminoalkylsilane. None of these patents disclose or remotely suggest the use of blends of an ethylenically unsaturated silane having at least 1 silicon bonded hydroxy or alkoxy group and an organosiloxane oligomer having at least one silicon bonded hydroxy or alkoxy group reactive with the inorganic substrate as an integral coupling composition for improving mechanical and electrical properties by mixing with an organic elastomer, a filler and peroxide followed by curing.

Martens et al U.S. Pat. No. 3,148,169 discloses the pretreatment of clay filler with a silicone fluid to coat the clay particles to impart a hydrophobic character to the clay and to mask the acidic nature of the clay so that peroxides later used as crosslinking agents are not deactivated.

Rykowski U.S. Pat. No. 4,179,537 discloses blends of an organofunctional silane, e.g., vinyltrialkoxysilanes, methacryloxyalkyltrialkoxysilanes, vinyltrihalosilanes and the like with a non-organofunctional silane, e.g., alkyltrialkoxysilanes, and the incorporation of such blends into organic resins, e.g., EPDM rubber for improving the adhesion between inorganic substrates such as clay fillers and the resin. This patent fails to disclose, teach or suggest the incorporation of siloxane oligomers in the coupling composition and suggests that the presence of siloxane oligomers in the resin-filler system could have a detrimental effect on coupling efficiency (col. 4, lines 54–63).

The Rykowski patent teaches the use of blends containing silanes having silicon-bonded 2-methoxyethoxy groups, e.g., vinyl-tris(2-methoxyethoxy)silane (Col. 2, lines 44–47), which releases 2-methoxyethanol as a hydrolysis by-product during use. The possible teratogenic properties of 2-methoxyethanol are currently under study indicating a potentially unacceptable risk in using vinyl-tris(2-methoxyethoxy)silane or similar materials as coupling agents or as components of coupling compositions.

Vinyl-tris(2-methoxyethoxy)silane, has been used industrially for many years as a coupling additive in mineral-filled EPM and EPDM wire and cable insulations. EPM is an ASTM designation for copolymers or ethylene and propylene; EPDM is a terpolymer of ethylene, propylene and a diene monomer such as ethylidene nor-bornene or 1,4 hexadiene. Vinyl-tris(2-methoxyethoxy)silane has been extensively used heretofore because it provides a unique balance of elastomer reinforcement and the degree of wet electrical stability required. It releases 2-methoxyethanol as a hydrolysis by-product when it is used and, unfortunately, 2-methoxy ethanol is now being studied as a suspected teratogen.

Vinyl-tris(2-methoxyethoxy)silane provided such a unique combination of high elastomer reinforcement, i.e., high degree or mechanical properties, and high degree of wet electrical stability, that it became the industry standard. No other single polymerizable, hydrolyzable silane has been found that can provide comparable performance on a one for one replacement basis. Many such other silanes provide acceptable electrical stability but fail to provide mechanical properties that are acceptable in every respect; notably as judged by 300% modulus which varies significantly with the other silanes.

None of the prior art references identified above discusses or suggests any compositions containing a blend comprising an organofunctional silane polymerizable with an organic elastomeric matrix and reactive with an inorganic substrate filler and an organosiloxane oligomer reactive with the inorganic substrate filler that is capable of providing mechanical properties and wet electrical stability properties comparable to the heretofore industry standard, vinyl-tris(2-methoxyethoxy)silanes.

3. Summary Of The Invention

The present invention is based on the discovery that coupling compositions containing an ethylenically unsaturated silane having hydroxy or alkoxy groups reactive with an inorganic substrate and an ethylenically unsaturated group polymerizable with an organic elastomeric matrix and an organosiloxane oligomer containing hydroxyl or alkoxy groups reactive with the inorganic substrate can be substituted on a one for one weight basis for the industry standard coupling agent vinyl-tris(2-methoxyethoxy)silane to provide comparable mechanical and electrical properties in the cured state of the organic elastomeric matrix without releasing the suspected teratogen, 2-methoxyethanol. It is also based on the further unexpected discovery that a higher ultimate elongation at equivalent modulus are provided by certain coupling compositions of the present invention as compared to the industry standard, vinyl-tris(2-methoxyethoxy)silane. As a result, wires and cables insulated with cured elastomeric matrixes containing our novel coupling compositions can survive more severe bending without harming the insulation and thus can be more easily threaded through intricate conduits or passageways during installation, a characteristic that is particularly advantageous under cold or adverse weather conditions.

The present invention also includes novel curable organic elastomeric compositions containing the novel coupling compositions compounded with an organic elastomer, an inorganic filler, and a peroxide crosslinking agent as well as other optional ingredients such as antioxidants, stabilizers, and the like conventionally used in compounding elastomeric compositions. In addition, the present invention includes novel cured elastomeric compositions obtained by heating the curable compositions of this invention to a temperature high enough to decompose the peroxide and thus initiate crosslinking. Furthermore, this invention includes wire and cable comprising a conductor coated with the novel cured composition as electrical insulation.

4. Detailed Description Of The Invention

In accordance with this invention, the novel coupling compositions are prepared by simply mixing from 5 to 95 wt. % of the ethylenically unsaturated silane and from 95 to 5 wt. % of an organosiloxane oligomer having at least one silicon-bonded hydroxyl or alkoxy group, based on the combined weight of the two components. Preferred ratios include 25 to 85 wt. % of the ethylenically unsaturated silane and 75 to 15 wt. % of the organosiloxane oligomers, based on the weight of the two components.

Suitable ethylenically unsaturated silanes contain at least one silicon-bonded ethylenically unsaturated group, preferably containing carbon and hydrogen or carbon, hydrogen and and oxygen, for example, vinyl, allyl, methacryloxypropyl, acryloxybutyl and the like, and at least one, preferably three, silicon-bonded hydroxy and/or alkoxy groups having 1 to 4 carbon atoms each, methoxy, ethoxy, isopropoxy and the like. Any valences of silicon of the silanes not filled by ethylenically unsaturated groups and hydroxyl or alkoxy groups are satisfied by monovalent hydrocarbon groups having 1 to 6 carbon atoms, such as methyl, ethyl, propyl, phenyl and the like. The silicon-bonded ethylenic groups of the silane are polymerizable with the ethylenically unsaturated groups contained in the organic elastomer; the hydroxy and/or alkoxy groups are reactive with the inorganic filler. Examples of suitable ethylenically unsaturated silanes are vinyltriethoxysilane, vinyltrimethoxysilane, allyltriethoxysilane, allyl triisopropoxysilane, gamma-methacryloxypropyltrimethoxysilane, gamma-acryloxypropyltriethoxysilane, beta-triacryloxyethoxytrimethoxysilane, and the like. Ethylenically unsaturated silanes that can be used in the composition of this invention include those represented by the formula:

$$R_aSiX_bY_c$$

wherein R is a silicon-bonded monovalent hydrocarbon group free of ethylenic unsaturation and having 1 to 6 carbon atoms, such as methyl, ethyl, butyl, isobutyl, phenyl and the like, X is a silicon-bonded hydroxyl or alkoxy group having 1 to 4 carbon atoms, such as, methoxy, ethoxy, isopropoxy and the like, Y is a silicon-bonded ethylenically unsaturated monovalent organic group composed of carbon and hydrogen or carbon, hydrogen and oxygen, such as vinyl, allyl, methacryloxypropyl, acryloxybutyl and the like, a is an integer of 0 to 2, preferably 0, b is an integer of 1 to 3, preferably 3, c is an integer of 1 to 3, preferably 1, and a+b+c is equal to 4.

The organosiloxane oligomers used in the coupling compositions of this invention have an average of no more than 20, preferably 2 to 10, siloxy units per molecule, it being understood that such oligomers are, in fact, mixtures of siloxane molecules having different numbers of siloxy units to the molecule. Suitable organosiloxane oligomers include linear, branched and cyclic polysiloxanes and mixtures of any two or more of the linear, branched and cyclic polysiloxanes. Such oligomers contain at least one silicon-bonded hydroxyl or alkoxy group per molecule and preferably at least one hydroxyl or alkoxy group per siloxy unit. Any valences of silicon not satisfied by a divalent oxygen atom in a ≡SiOSi≡ linkage or by a hydroxy or alkoxy group is satisfied by a monovalent hydrocarbon group free of ethylenic unsaturation and having 1 to 6 carbon atoms, preferably alkyl. Organosiloxane oligomers useful in the compositions of this invention include those linear, branched and cyclic oligomers represented by the formula:

$$D_g[R_dX_{2-d}SiO]_e[R_2SiO]_fZ_g$$

wherein R and X are as defined above and may be the same or different throughout the molecule, D is X or OSiR₃, Z is R or SiR₃, d is an integer of 0 or 1, preferably 1, e is an integer having an average value of 1 to about 10, f is an integer having an average value of 0 to about 9, g is an integer of 0 or 1, e+f is equal to 3 to about 10 when g is 0, e+f is equal to 1 to about 9 when g is 1, and e+f+g is equal to 2 to about 10. Preferred organosiloxane oligomers are represented by the formula $$RO[R'(RO)SiO]_xR$$

wherein R is as defined above, preferably alkyl such as ethyl, R' is alkyl, preferably methyl, and x is an integer having an average value of 2 to about 10.

When vinyltriethoxysilane is used in the coupling compositions, it is present in the preferred amount of 55 to 85 wt. %, most preferably 65 to 75 wt. %, and organosiloxane oligomer is present in the preferred amount of 45 to 15 wt. %, most preferably 35 to 25 wt. %, based on the combined weights of these two components. In the case of using vinyltrimethoxysilane in the coupling composition, it is present in the preferred amount of 40 to 80 wt. %, most preferably, 60 to 70 wt. %, and the organosiloxane oligomer is present in the preferred amount of 60 to 20 wt. %, most preferably 40 to 30 wt. %, based on the combined weights of the two components. When using gamma-methacryloxypropyl trimethoxysilane in the coupling compositions, it is present in the preferred amount of 25 to 65 wt. %, most preferably 45 to 55 wt. %, and the organosiloxane oligomer is present in the preferred amount of 75 to 35 wt.

%, most preferably 55 to 45 wt. %, based on the combined weight of the two components.

Optionally, the coupling compositions of this invention can contain a third component which is ethylenically unsaturated organosiloxane oligomer having per molecule no more than 100 siloxy units and having per molecule at least one silicon-bonded ethylenically unsaturated group polymerizable with the organic elastomeric matrix. The third component can be used, if desired, to replace a portion of the ethylenically unsaturated silane for the purpose of reducing volatitity and improve somewhat the electrical properties. The third component can be present in the coupling composition in amounts up to 10 wt. %, preferably up to 5 wt. %, based on the combined weights of the three components and the proportion of ethylenically unsaturated silane is decreased by a corresponding amount. Suitable ethylenically unsaturated organosiloxane oligomers include linear, branched and cyclic oligomers or mixtures of two or more of the linear, branched and cyclic oligomers. Such oligomers contain at least one silicon-bonded monovalent ethylenically unsaturated group, such as vinyl, allyl, methacryloxypropyl, acryloxybutyl and the like, and preferably at least one such ethylenically unsaturated group per siloxy unit in the molecule, any valence of silicon not satisfied by a divalent oxygen atom in a $\equiv$SiOSi$\equiv$ linkage or by an ethylenically unsaturated group is satisfied by a monovalent hydrocarbon or hydrocarbonoxy group free of ethylenic unsaturation, preferably an alkyl or alkoxy group having 1 to 12 carbon atoms. Ethylenically unsaturated organosiloxane oligomers useful in this invention include those linear, branched or cyclic oligomers represented by the formula:

$$R''_p[R_dY_{2-d}SiO]_m[R_2SiO]_n[SiR''_3]_p$$

wherein d, R and Y are as described above and need not be the same through the molecule, R'' is a monovalent hydrocarbon group preferably alkyl, or a hydrocarbonoxy group, preferably alkoxy, having 1 to 18 carbon atoms and being free of ethylenic unsaturation and need not be the same throughout the molecule, m is an integer of 1 to about 100, n is an integer of 0 to about 99, and p is an integer of 0 or 1, m+n is equal to 1 to about 98 when p is 1, m+n is equal to 3 to about 100 when p is 0, and m+n+p is equal to 2 to about 100. Preferred ethylenically unsaturated organosiloxane oligomers are represented by the formula:

$$R''[RYSiO]_ySiYR''R$$

wherein R, R'' and Y are as defined above and preferably R'' is alkoxy having 1 to 18 carbon atoms and R is alkyl having 1 to 4 carbon atoms and y is 4 to 100, preferably 4 to 16. Y is preferably vinyl but can be any ethylenically unsaturated group polymerizable with the organic elastomeric matrix.

The curable compositions of the present invention comprise, (1) an organic elastomer, (2) an inorganic filler, (3) a coupling composition as described above, and (4) a peroxide capable of crosslinking the organic elastomer. Typical organic elastomers to which the present invention applies include any of the synthetic or natural rubbers with which fillers are conventionally employed including natural rubber, synthetic rubbers such as styrene-butadiene rubber, ethylene-propylene copolymers, ethylene-propylene terpolymer rubbers in which the third monomeric component is ethylidene norbornene or 1,4-hexadiene, urethane rubbers, polyisobutadiene rubbers, and any other vulcanizable or crosslinkable elastomeric material.

The organic fillers used in the curable compositions are known to those skilled in the art and include any suitable finely divided or particulate inorganic substance. At the time of incorporation into the curable composition most fillers may be in the form of finely divided particles. They may be approximately isometric, having a maximum diameter, i.e., a maximum linear dimension of ten microns, preferably five microns; or they may be in the form of plates or needles (fibers) having a thickness or diameter of ten microns or less, preferably five microns or less. Compositions containing larger particles tend to be highly abrasive to processing equipment and may be undesirable or less preferred for this reason. The minimum size of the filler particles is not critical, any of the conventionally used fillers being suitable in this respect. Among the specific fillers which may be used in the present invention are asbestos, ground glass, kaolin and other clay minerals, silica, calcium silicate, calcium carbonate (whiting), magnesium oxide, barium carbonate, barium sulfate (barytes), metal fibers and powders, glass fibers, refractory fibers, non-reinforcing carbon blacks, titanium dioxide, mica, talc, chopped glass, alumina, alumina-trihydrate, quartz, wollastonite (calcium silicate), and inorganic coloring pigments. Kaolin clay is a filler of choice in the wire and cable industry and therefore is preferred.

Suitable peroxides are also well known to those skilled in this art. Any peroxide that is capable of crosslinking the organic elastomer can be used. For example, any of the peroxides described or listed in Martens' U.S. Pat. No. 3,148,169 can be employed and said Martens' disclosure is incorporated herein by reference. The peroxide is heat decomposable, that is, is heat activated so that when a mixture of the organic elastomer and peroxide is heated to a given temperature or temperature range peroxide decomposes and the crosslinking reaction takes place.

Any other additives to the curable composition can be used. For example, stabilizers and antioxidants can be added. Additional pigmentation can be provided and any other additive for providing other properties can be used.

The proportions of components in the curable composition are not narrowly critical and conventionally are based on weight parts per 100 wt. parts of organic elastomer. On this basis the inorganic filler can be varied from 25 to 200, preferably 50 to 150, wt. parts per 100 wt. parts of elastomer. The coupling composition can be present in an amount ranging from 0.1 to 10, preferably from 0.5 to 3 weight parts per 100 wt. parts of filler and the peroxide can be used in amounts of 0.5 to 10 wt. parts, preferably 2 to 5 wt. parts per 100 wt. parts of elastomer.

The curable compositions except for the peroxide component are conventionally prepared in a Banbury mixer or any other intensive mixer. Accepted rubber industry techniques were used. Then the resulting compound is transferred to a roll mill wherein it is rolled and the peroxide is added and mixed into the compound to result in a curable composition which then can be used to coat electrical conductors for the purpose of insulating same after curing. These compositions can be used for a variety of other electrical insulation purposes including encapsulating of electrical components and other applications.

In order to cure the curable compositions it is only necessary to apply heat above the temperature at which the peroxide decomposes and thus becomes activated. Preferably a peroxide is chosen for use having a decomposition temperature in excess of 200° F., preferably in excess of 250° F. In producing wire and cable the curable composition in heated, readily deformable condition (but below the decomposition temperature of the peroxide) is applied through an extruder to a conductor to form an insulating coating around the conductor. After extrusion onto the conductor the combined conductor and coating of curable composition is passed into an oven or autoclave where the temperature is raised to a point above the decomposition temperature of the peroxide upon which the curable composition cross links or cures to form a tough thermoset insulating coating around the conductor.

The following Examples are presented. The numbered Examples represent the present invention; the lettered Examples do not represent this invention but are presented for comparison purposes. Temperatures given are in °F. and parts and percentages are on a weight basis unless otherwise stated. The following designations used in the Examples and elsewhere herein have the following meanings.

| | |
|---|---|
| Me: methyl | |
| Et: ethyl | |
| Vi: vinyl | |
| psi: pounds per square inch | |
| %: percent by weight unless otherwise stated | |
| g: grams | |
| wt: weight | |
| pts: parts by weight unless otherwise stated | |
| Hardness, Shore A | ASTM D-2240-81 |
| Ultimate elongation, % | |
| 300% Modulus, psi | ASTM D-412-80 |
| Tensile, psi | |
| Dielectric Constant at 1kc | |
| as cured | |
| 7 days in 75° C. water | |
| Dissipation Factor at 1kc | ASTM D-150-81 |
| as cured | |
| 7 days in 75° C. water | |
| Volume Resistivity, ohm-cm~ | ASTM D-991-82 |
| Oscillating Disc Rheometer~ | ASTM D-2084-81 |

In the Tables, the values given for each component or ingredient of the compositions defined therein are on a weight basis per 100 weight parts of elastomer, i.e., ethylene-propylene copolymer.

EXAMPLES 1–5

Eight rubber formulations (Examples 1–5 and Comparisons A, B and C) were prepared from 100 wt. parts of an ethylene-propylene copolymer (Vistalon 404 sold by Exxon), 110 wt. parts of calcined clay (Whitetex sold by Freeport Kaolin), 5 wt. parts of zinc oxide, 1.5 wt. parts of antioxidant (Agerite Resin D sold by R. T. Vanderbilt), 5 wt. parts of carbon black and 2 wt. parts of a peroxide identified in Table 1 and 1.1 wt. parts of a silane or a blend of a silane and a siloxane oligomer as identified in Table 1. In each instance the formulations were prepared in a "B" Banbury mixer using the following mixing procedure and also using full cooling water in the mixing machine. Initially the copolymer and antioxidant were placed in the mixer and mixed for 30 seconds at #2 speed after the ram was completely down. Thereafter, one-half of the clay was added and mixed for 30 seconds at #2 speed after the ram was completely down following which the second half of the clay and all of the carbon black were added and mixed for 30 seconds at #2 speed after ram down. In Examples 1–3 the silane-siloxane blend was added with the second half of the clay and in Examples 4 and 5 and Comparisons A–C the silane or silane-siloxane blend was added with the first half of the clay. Then in all instances all of the zinc oxide was added and the formulation mixed again at #2 speed for 30 seconds with the ram fully down. Thereafter, any materials on the exterior surfaces on the ram or mixer were swept into the mixture and the ram run down after which mixing was continued for 30 seconds at #2 speed. The exterior surfaces of the ram and mixture were swept to move any of the above-mentioned ingredients into the mixture after which the contents were again mixed at #3 speed for 15 seconds. Thereafter, the contents of the mixer were dumped and sheeted off on a 6×12 roll mill using a roll temperature of 120° to 130° F.

The resulting rubber compounds were catalyzed with the above-identified peroxide on the 6×12 roll mill at a roll temperature of 120° to 130° F. Test plaques were made from each rubber compound and cured for 25 minutes at 340° F. The test plaques for each compound were tested for mechanical properties and electrical properties as set forth in Table 1. The results are likewise given in Table 1.

Comparison A illustrates the poor results in mechanical properties, especially modulus and the electrical properties including poor dielectric constant under wet conditions and poor dissipation factor under wet conditions. Comparison B illustrates a highly acceptable formulation commercially used heretofore but which used a silane that gives off a by-product that is suspected of being teratogenic. Examples 1–5 illustrate the improvements in elongation while maintaining acceptable modulus, hardness and tensile strength by using the blends of this invention which are not troubled by teratogenic or other toxic side effects from by-products. In addition, in some instances, for example as shown in Examples 3 and 4, the mechanical properties are superior to those obtained with the best available commercial formulation. These Examples demonstrate the achievements of providing a safer formulation in use and providing in some instances better properties than the best commercial formulation. The electrical properties as shown for Examples 1–5 in Table 1 are not deteriorated. Moreover, Table 1 illustrates the control available to the compounder through the use of the present invention for controlling mechanical properties of the ultimate compound. In addition, the replacement of a portion of the vinyltrimethoxysilane with an equivalent weight amount of methylvinylsiloxane as illustrated by Examples 2 and 5 do not alter the performance of the blend. The results given in Table 1 for formulations 1–5 also illustrate that the wet electrical properties for Examples 1–5 and Comparisons B and C are stable. The best mechanical properties, i.e., elongation, modulus and tensile strength were achieved by the compound of Example 4 of the present invention.

TABLE 1

| EXAMPLE | A | B | C | 1 | 2 | 3 | 4 | 5 |
|---|---|---|---|---|---|---|---|---|
| Ethylene-propylene copolymer | 100 | | | | | | | |
| Calcined clay | 110 | | | | | | | |
| Zinc oxide | 5 | | | | | | | |
| Antioxidant[1] | 1.5 | | | | | | | |
| Carbon black | 5 | | | | | | | |
| Peroxide[2] | 2.0 | | | | | | | |
| Vinyl-tris(2-methoxyethoxy) silane | — | 1.1 | — | — | — | — | — | — |
| Vinyltrimethoxysilane | — | — | — | .55 | .495 | .66 | .77 | .715 |
| Methylethoxysiloxane oligomer[3] | — | — | 1.1 | .55 | .55 | .44 | .33 | .33 |
| Methylvinylsiloxane[4] | — | — | — | — | .055 | — | — | .055 |
| Mechanical Properties, cured 25 minutes at 340° F. | | | | | | | | |
| Hardness, Shore A | 62 | 63 | 61 | 63 | 63 | 63 | 62 | 62 |
| Ultimate elongation, % | 960 | 350 | 980 | 440 | 450 | 420 | 370 | 410 |
| 300% Modulus, psi | 370 | 1030 | 410 | 930 | 930 | 1000 | 1040 | 990 |
| Tensile, psi | 860 | 1100 | 880 | 1030 | 1020 | 1090 | 1110 | 1070 |
| Set at break, % | 120 | 15 | 115 | 20 | 25 | 20 | 10 | 15 |
| Electrical Properties | | | | | | | | |
| Dielectric Constant at 1kc | | | | | | | | |
| as cured | 3.07 | 2.99 | 2.96 | 3.07 | 3.09 | 3.04 | 3.02 | 2.96 |
| 7 days in 75° C. water | 4.21 | 2.97 | 2.89 | 3.07 | 3.09 | 3.00 | 2.90 | 2.90 |
| Dissipation Factor at 1kc | | | | | | | | |
| as cured | .003 | .003 | .003 | .003 | .004 | .003 | .003 | .004 |
| 7 days in 75° C. water | .072 | .003 | .003 | .002 | .003 | .003 | .003 | .003 |
| Volume Resistivity $\times 10^{15}$[5] | | | | | | | | |
| as cured | 24 | 61 | 54 | 12 | 18 | 16 | 63 | 60 |
| 7 days in 75° C. water | .01 | 8.5 | 7.8 | 7.7 | 11 | 7.4 | 8.7 | 9.1 |

FOOTNOTES TO TABLE 1
[1] poly-2,2,4-trimethyl-1,2-dihydroquinoline
[2] α,α'-bis(t-butylperoxy)diisopropylbenzene
[3] A mixture of linear, branched and cyclic oligomers made by reacting MeSiCl3, water and ethanol and having an average molecular weight of about 500 and an ethoxy content of about 35 to 55 wt. %. The mixture can be represented, on a linear basis, by the formula: EtO[(Me)(EtO)SiO]$_x$Et; x = 2,3,4,5 and higher.
[4] A mixture of fatty alcohol, mostly dodecoxy endblocked methylvinylsiloxane fluid having the formula $C_nH_{2n+1}O[(Me)(Vi)SiO]_xC_nH_{2n+1}$ in which n = 10 to 18, preferably 12 to 16 and x = 4 through 100, preferably 4 through 16.
[5] ohm-cm

EXAMPLES 6–10

Five rubber formulations (Examples 6–10) were prepared using the types and amounts of components set forth in Table 2 below. In the cases of Examples 6–8 the procedure used was the same as those described for Examples 1–3. In Examples 9 and 10 the procedure used was the same as that described in Examples 4 and 5. The resulting rubber compounds were catalyzed and test plaques were cured from each rubber compound and tested in the manner described for Examples 1–5. The test results are given in Table 2 below.

In Table 2 the results for Examples 6–10 are compared against rubber compound containing no silane or siloxane coupling agent (Comparison A), against one of the better known commercial rubber compounds containing one of the better silane coupling agents (Comparison B), and rubber compounds containing the siloxane oligomer or fluid (Comparison C). The problem with the silane used in Comparison B is that it gives off a by-product which is suspected of being teratogenic. None of the silane-siloxane blends used in Examples 6–10 are suspected of being or emitting teratogens, therefore providing this further advantage to the compositions made pursuant to this invention. Furthermore, the mechanical properties of rubber compounds of at least some of the Examples of this invention are better than those of the commercial compound of Comparison B, specifically the rubber compound of Example 8 provides a substantial high tensile strength and modulus and a substantial higher ultimate elongation. Example 9 provides higher modulus and tensile strength. The wet electrical properties of all compositions containing silane or silane-siloxane blends are stable according to the data given in Table 2.

TABLE 2

| EXAMPLE | A | B | C | 6 | 7 | 8 | 9 | 10 |
|---|---|---|---|---|---|---|---|---|
| Ethylene-propylene copolymer | 100 | | | | | | | |
| Calcined clay | 110 | | | | | | | |
| Zinc oxide | 5 | | | | | | | |
| Antioxidant[1] | 1.5 | | | | | | | |
| Carbon black | 5 | | | | | | | |
| Peroxide[2] | 2.0 | | | | | | | |
| Vinyl-tris(2-methoxyethoxy) silane | — | 1.1 | — | — | — | — | — | — |
| Vinyltriethoxysilane | — | — | — | .605 | .715 | .66 | .825 | .77 |
| Methylethoxysiloxane oligomer[3] | — | — | 1.1 | .495 | .385 | .385 | .275 | .275 |
| Methylvinylsiloxane[4] | — | — | — | — | — | .055 | — | .055 |
| Mechanical Properties, cured 25 minutes at 340° F. | | | | | | | | |
| Hardness, Shore A | 62 | 63 | 61 | 63 | 63 | 64 | 63 | 62 |
| Ultimate elongation, % | 960 | 350 | 980 | 440 | 410 | 410 | 350 | 380 |

TABLE 2-continued

| EXAMPLE | A | B | C | 6 | 7 | 8 | 9 | 10 |
|---|---|---|---|---|---|---|---|---|
| 300% Modulus, psi | 370 | 1030 | 410 | 950 | 960 | 1010 | 1040 | 1050 |
| Tensile, psi | 860 | 1100 | 880 | 1030 | 1060 | 1090 | 1110 | 1020 |
| Set at Break, % | 120 | 15 | 115 | 20 | 20 | 20 | 15 | 15 |
| Electrical Properties | | | | | | | | |
| Dielectric Constant at 1kc | | | | | | | | |
| as cured | 3.07 | 2.99 | 2.96 | 3.02 | 3.05 | 3.07 | 3.04 | 3.08 |
| 7 days in 75° C. water | 4.21 | 2.97 | 2.89 | 3.03 | 3.05 | 3.06 | 2.92 | 3.10 |
| Dissipation Factor at 1kc | | | | | | | | |
| as cured | .003 | .003 | .003 | .003 | .004 | .004 | .003 | .004 |
| 7 days in 75° C. water | .072 | .003 | .003 | .002 | .002 | .003 | .003 | .003 |
| Volume Resistivity × $10^{15(5)}$ | | | | | | | | |
| as cured | 24 | 61 | 54 | 62 | 9.7 | 24 | 54 | 34 |
| 7 days in 75° C. water | .01 | 8.5 | 7.8 | 5.1 | 6.7 | 6.9 | 7.1 | 5.7 |

[1] through [5] same as footnotes [1]–[5] respectively of Table 1.

EXAMPLES 11–14

Four rubber formulations (Examples 11–14) were prepared from components substantially the same as those described for Examples 1–10 except that the silanes and siloxanes and the amounts thereof as set forth in Table 3 below were used. The procedures used in Examples 11 and 12 were the same as procedures as described in Examples 1–3. Examples 13 and 14 used the same procedures as are described for Examples 4 and 5. The resulting rubber compounds were catalyzed and test plaques were made and cured and tested in the manner described for Examples 1–10 for mechanical properties and electrical properties. The results are set forth in Table 3.

None of the rubber compounds produced according to this invention in Examples 11–14 utilize a silane which produces a by-product which is suspected of being teratogenic and however provides equivalent or better mechanical and electrical properties than one of the best known commercial compounds such as that described for Comparison B. For example, the modulus for Example 13 is somewhat improved with little sacrifice of tensile strength. The results of Table 3 clearly illustrate the control provided to the compounder of mechanical and electrical properties by means of manipulation of the relative proportions of siloxane and silane coupling agents used in the blends of the present invention.

TABLE 3

| EXAMPLE | A | B | C | 11 | 12 | 13 | 14 |
|---|---|---|---|---|---|---|---|
| Ethylene-propylene copolymer | 100 | | | | | | |
| Calcined clay | 110 | | | | | | |
| Zinc oxide | 5 | | | | | | |
| Antioxidant[1] | 1.5 | | | | | | |
| Carbon black | 5 | | | | | | |
| Peroxide[2] | 2.0 | | | | | | |
| Vinyl-tris(2-methoxyethoxy)silane- | — | 1.1 | — | — | — | — | — |
| methacryloxypropyltrimethoxysilane | — | — | — | .385 | .495 | .44 | .715 |
| Methylethoxysiloxane oligomer[3] | — | — | 1.1 | .715 | .605 | .605 | .385 |
| Methylvinylsiloxane[4] | — | — | — | — | — | .055 | — |
| Mechanical Properties, cured 25 minutes at 340° F. | | | | | | | |
| Hardness, Shore A | 62 | 63 | 63 | 64 | 63 | 63 | 64 |
| Ultimate elongation, % | 960 | 350 | 980 | 420 | 400 | 350 | 370 |
| 300% Modulus, psi | 370 | 1030 | 410 | 970 | 990 | 1040 | 1010 |
| Tensile, psi | 860 | 1100 | 880 | 1050 | 1070 | 1090 | 1080 |
| Set at Break, % | 120 | 15 | 115 | 20 | 20 | 10 | 15 |
| Electrical Properties | | | | | | | |
| Dielectric Constant at 1kc | | | | | | | |
| as cured | 3.07 | 2.99 | 2.96 | 3.05 | 3.01 | 3.06 | 3.05 |
| 7 days in 75° C. water | 4.21 | 2.97 | 2.89 | 3.04 | 3.00 | 3.05 | 3.03 |
| Dissipation Factor at 1kc | | | | | | | |
| as cured | .003 | .003 | .003 | .004 | .003 | .003 | .004 |
| 7 days in 75° C. water | .072 | .003 | .003 | .003 | .002 | .003 | .003 |
| Volume Resistivity × $10^{15(5)}$ | | | | | | | |
| as cured | 24 | 61 | 54 | 11 | 4.9 | 60 | 58 |
| 7 days in 75° C. water | .01 | 8.5 | 7.8 | 7.2 | 6.0 | 9.6 | 8.2 |

[1] through [5] same as footnotes [1] through [5] respectively of Table 1.

EXAMPLES 15–21

Eight rubber formulations (Examples 15–21 and Comparison D) were prepared using the types and amounts of components set forth in Table 4 below. In the cases of Comparison D and Examples 15, 17, 19 and 20, the preparation procedure used was the same as that described for Examples 1–3. In Examples 16, 18 and 21 the procedure used was the same as that described in Examples 4 and 5. The resulting rubber compounds were catalyzed with the peroxide specified in Table 4 and test plaques were made from each rubber compound. The test plaques were cured and tested in the manner described for Examples 1–5. The test results are given in Table 4 below.

The results given in Table 4 illustrate the advantages of the invention specifically in providing coupling compositions having satisfactory hardness, satisfactory elongation, satisfactory modulus and tensile strength and a low % set at break. In addition the test plaques of Examples 15–21 exhibited satisfactory wet and dry electrical properties. Quite surprisingly the test plaque of Example 15 had properties comparable to those of the test plaque of comparison D even though it contained 75% vinyltriethoxysilane and 25% of the oligomer without at the same time undergoing an increase in the % set at break. In all Examples 15-21 the % set at break was superior to that of Comparison C. In addition, the ultimate elongation of Examples 15-21 and the 300% modulus and the tensile strength figures for Examples 15-21 were significantly better than those of Comparison C.

used. Comparison F illustrates the improvement in mechanical and electrical properties by employing a prior art coupling agent which however is under study for possible teratogenic effects. The test plaques of Examples 22-24 illustrate mechanical properties and electrical properties which are comparable to those of Comparison F and the by-products of the coupling agents used in Examples 22-24 are not under study for teratogenic effects.

TABLE 4

| EXAMPLE | D | C | 15 | 16 | 17 | 18 | 19 | 20 | 21 |
|---|---|---|---|---|---|---|---|---|---|
| Ethylene-propylene copolymer | 100 | | | | | | | | |
| Calcined clay | 110 | | | | | | | | |
| Zinc oxide | 5 | | | | | | | | |
| Antioxidant[1] | 1.5 | | | | | | | | |
| Carbon black | 5 | | | | | | | | |
| Peroxide | 2 | | | | | | | | |
| Vinyl-tris(2-methoxyethoxy) silane | 1.1 | | | | | | | | |
| Vinyltriethoxysilane | — | — | .825 | .935 | — | — | — | — | — |
| Vinyltrimethoxysilane | — | — | — | — | .44 | .88 | — | — | — |
| methacryloxypropyltri-methoxysilane | — | — | — | — | — | — | .275 | .33 | .605 |
| Methylethoxysiloxane oligomer[3] | — | 1.1 | .275 | .165 | .66 | .22 | .825 | .715 | .495 |
| Methylvinylsiloxane[4] | — | — | — | — | — | — | — | .055 | — |
| Mechanical Properties, cured 25 minutes at 340° F. | | | | | | | | | |
| Hardness, Shore A | 63 | 63 | 63 | 63 | 61 | 62 | 63 | 63 | 63 |
| Ultimate elongation % | 370 | 980 | 370 | 360 | 490 | 360 | 480 | 450 | 390 |
| 300% Modulus, psi | 1070 | 410 | 1060 | 1060 | 870 | 1080 | 860 | 930 | 1020 |
| Tensile, psi | 1140 | 880 | 1130 | 1140 | 960 | 1130 | 960 | 1010 | 1090 |
| Set at break, % | 15 | 115 | 15 | 10 | 30 | 10 | 25 | 20 | 15 |
| Electrical Properties | | | | | | | | | |
| Dielectric Constant at 1kc | | | | | | | | | |
| as cured | 3.04 | 2.96 | 3.03 | 3.09 | 3.09 | 3.06 | 3.05 | 3.06 | 3.07 |
| 7 days in 75° C. water | 3.09 | 2.89 | 3.08 | 3.11 | 3.03 | 3.03 | 3.09 | 3.06 | 2.95 |
| Dissipation Factor at 1kc | | | | | | | | | |
| as cured | .003 | .003 | .003 | .003 | .003 | .003 | .003 | .004 | .004 |
| 7 days in 75° C. water | .003 | .003 | .002 | .003 | .002 | .003 | .003 | .002 | .003 |
| Volume Resistivity × $10^{15(5)}$ | | | | | | | | | |
| as cured | 3.8 | 54 | 8.8 | 24 | 1.2 | 18 | 1.2 | 1.2 | 61 |
| 7 days in 75° C. water | 3.2 | 7.8 | 5.8 | 6.3 | 9.5 | 9.8 | 5.7 | 7.2 | 7 |

[1] through [5] same as footnotes [1]-[5] respectively of Table 1.

EXAMPLES 22-24

Five rubber formulations (Examples 22-24 and Comparisons E and F) were prepared from 99.4 wt. parts ethylene-propylene terpolymer (Vistalon 2504 sold by Exxon), 110 wt. parts clay (Icecap K sold by Burgess), 20 wt. parts of a paraffinic hydrocarbon oil used as plasticizer (Sunpar 2280 sold by Sun Oil Company), 1.5 wt. parts of antioxidant (Agerite Resin D), 5 wt. parts zinc oxide, 5 wt. parts carbon black, 5.6 wt. parts red lead dispersion (ERD 90 sold by Wyrough And Loser) used to assist in stabilizing the wet electrical properties and the types and amounts of silanes or coupling compositions containing silanes and siloxane oligomers of the types and in the amounts given in Table 5 below. In each instance the formulations were prepared in a "B" Banbury mixer using full cooling water and using the same mixing procedure as that described in Examples 4 and 5 wherein the paraffinic hydrocarbon oil is added with the second half of the clay and carbon black.

The resulting rubber compounds were catalyzed as described in regard to Examples 1-5 and test plaques were made from each resulting rubber compound. The test plaques were cured for 25 minutes at 340° F. and were tested for mechanical and electrical properties. The results of these tests are provided in Table 5.

Comparison E illustrates the poor results in excessive elongation and set a break when no coupling agent is

TABLE 5

| EXAMPLE | E | F | 22 | 23 | 24 |
|---|---|---|---|---|---|
| Ethylene-propylene terpolymer | 100 | | | | |
| Calcined clay | 110 | | | | |
| Zinc oxide | 5 | | | | |
| Antioxidant[1] | 1.5 | | | | |
| Carbon black | 5 | | | | |
| Peroxide[2] | 2 | | | | |
| Vinyl-tris(2-methoxyethoxy) silane | | 1.1 | | | |
| Vinyltriethoxysilane | | | .77 | .825 | .935 |
| Methylethoxysiloxane oligomer[3] | | | .275 | .275 | .165 |
| Methylvinylsiloxane[4] | | | | .055 | |
| Mechanical Properties, cured 25 minutes at 340° F. | | | | | |
| Hardness, Shore A | 61 | 64 | 64 | 62 | 63 |
| Ultimate elongation, % | 710 | 360 | 470 | 430 | 410 |
| 300% Modulus, psi | 470 | 1580 | 1050 | 1110 | 1170 |
| Tensile, psi | 1260 | 1540 | 1380 | 1410 | 1450 |
| Set at break, % | 55 | 10 | 15 | 10 | 10 |
| Electrical Properties | | | | | |
| Dielectric Constant at 1kc | | | | | |
| as cured | 3.00 | 3.01 | 2.97 | 3.02 | 3.06 |
| 7 days in 75° C. water | 3.45 | 2.99 | 3.04 | 3.00 | 3.00 |
| Dissipation Factor at 1kc | | | | | |
| as cured | .004 | .005 | .005 | .005 | .005 |
| 7 days in 75° C. water | .027 | .003 | .003 | .003 | .003 |
| Volume Resistivity × $10^{15(5)}$ | | | | | |
| as cured | 16 | 15 | 63 | 14 | 63 |
| 7 days in 75° C. water | .43 | 8.6 | 14 | 15 | 5.8 |

[1] through [5] same as footnotes [1]-[5] respectively in Table 1.

In all of the Examples presented above, the curing characteristics of each curable composition were determined using an oscillating disc rheometer, such as the Monsanto Rheometer. In every case, there was not significant effect of the coupling agent or coupling composition on the curing characteristics.

When the ethylenically unsaturated hydrolyzable silanes used in Examples 1–24 are substituted on a weight for weight basis for vinyl tris(2-methoxyethoxy)silane in the absence of an organosiloxane oligomer, there results a cured elastomer which has a % elongation below that obtained by the vinyl tris(2-methoxyethoxy)silane which has been found to be the minimum acceptable by the wire and cable industry. If lower loadings of the silanes of Examples 1–24 (in the absence of oligomer), an acceptable % elongation can be obtained at the loss, however, of electrical stability properties.

What is claimed is:

1. An electrical cable comprising a conductor and a coating of insulation on said conductor said coating comprising a cured composition comprising:
   (1) an organic elastomer;
   (2) an inorganic filler;
   (3) a coupling composition comprising:
      (a) 5 to 95 wt. % of an ethylenically unsaturated silane selected from the group consisting of vinyltriethoxysilane, vinyltrimethoxysilane and gamma-methacryloxypropyltrimethoxysilane;
      (b) 95 to 5 wt. % of a methyl ethoxy siloxane fluid having an average molecular weight of about 500, having an ethoxy content of 35 to 55 wt. %, and having the formula:

$$C_2H_5O[(CH)_3(C_2H_5O)SiO]_xC_2H_5$$

in which x is an integer of about 10; and
      (c) 0 to 10 wt. % of methylvinyl siloxane fluid having the formula:

$$C_{12}H_{25}O[(CH_3)(CH_2=CH)SiO]_yC_{12}H_{25}$$

wherein y is an integer of 4 to 20; and
   (4) a peroxide capable of crosslinking said organic elastomer.

2. The electrical cable of claim 1 wherein the coupling composition comprises:
   (a) 65 to 75 wt. % vinyltriethoxysilane and
   (b) 35 to 25 wt. % of said methyl ethoxy siloxane fluid;
and wherein the cured composition was cured by heating to a temperature above the decomposition temperature of said peroxide.

3. The electrical cable of claim 1 wherein the coupling composition comprises:
   (a) 60 to 70 wt. % vinyltrimethoxysilane and
   (b) 35 to 25 wt. % of said methyl ethoxy silane fluid; and wherein the cured composition was cured by heating to a temperature above the decomposition temperature of said peroxide.

4. The electrical cable of claim 1 wherein the coupling composition comprises:
   (a) 45 to 55 wt. % gamma-methacryloxypropyltrimethoxysilane and
   (b) 55 to 45 wt. % of said methyl ethoxy silicone fluid;
and wherein the cured composition was cured by heating to a temperature above the decomposition temperature of said peroxide.

* * * * *